US005548005A

United States Patent [19]

Kurth et al.

[11] Patent Number: 5,548,005
[45] Date of Patent: Aug. 20, 1996

[54] AQUEOUS, RADIATION-CURABLE BINDER DISPERSIONS

[75] Inventors: Inge Kurth, Wiesbaden; Gerhard Brindoepke, Sulzbach; Manfred Marten, Mainz, all of Germany

[73] Assignee: Hoechst Aktiengesellschaft, Frankfurt am Main, Germany

[21] Appl. No.: 357,738

[22] Filed: Dec. 16, 1994

[30] Foreign Application Priority Data

Dec. 22, 1993 [DE] Germany .......................... 43 43 885.7

[51] Int. Cl.$^6$ ............................ C08L 63/10; C08L 75/08; C08L 75/16
[52] U.S. Cl. ............................ 523/414; 523/415; 522/84; 522/85; 522/96; 522/97; 522/92; 522/100; 522/103
[58] Field of Search .................................. 522/84, 85, 86, 522/92, 97, 100, 103, 96, 95; 523/414, 415

[56] References Cited

U.S. PATENT DOCUMENTS

| | | | |
|---|---|---|---|
| 3,124,604 | 3/1964 | Huether | 260/429.9 |
| 3,183,112 | 5/1965 | Gemassmer | 106/316 |
| 3,919,218 | 11/1975 | Schmitt et al. | 260/248 |
| 4,070,323 | 1/1978 | Vanderhoff et al. | 260/29.6 |
| 4,125,503 | 11/1978 | McCarty et al. | 522/103 |
| 4,179,478 | 12/1979 | Rosenkranz et al. | 522/103 |
| 4,225,695 | 9/1980 | Schuster et al. | 528/75 |
| 4,324,879 | 4/1982 | Bock et al. | 528/45 |
| 4,339,566 | 7/1982 | Rosenkranz et al. | 528/68 |
| 4,859,788 | 8/1989 | Brindoepke et al. | 558/398 |
| 4,886,845 | 12/1989 | Becker et al. | 523/403 |
| 5,095,066 | 3/1992 | Meixner et al. | 524/500 |
| 5,314,942 | 5/1994 | Coogan et al. | 525/455 |
| 5,362,773 | 11/1994 | Brindoepke et al. | 523/415 |

FOREIGN PATENT DOCUMENTS 0562860  9/1993  European Pat. Off. .

Primary Examiner—Susan W. Berman
Attorney, Agent, or Firm—Foley & Lardner

[57] ABSTRACT

Aqueous, radiation-curable binders and binder dispersions are disclosed that contain (A) a radiation-curable binder, and (B) a radiation-curable, hydrophilic polyepoxy-acrylate.

23 Claims, No Drawings

AQUEOUS, RADIATION-CURABLE BINDER DISPERSIONS

BACKGROUND OF THE INVENTION

The present invention relates to aqueous, radiation-curable binder dispersions which are free from solvents. The dispersions contain a radiation-curable binder and a radiation-curable emulsifier.

(Meth)acryloyl-containing polyurethanes (so-called urethane (meth)acrylates) and polyepoxides have been known for a long time and are very highly suited as binders, for example, for UV-curable coating materials (cf. e.g., DE-A 27 37 406). The relatively high viscosity of these products almost always makes it necessary to use them in conjunction with organic solvents.

Water-dilutable urethane (meth)acrylates also are known (cf. e.g., DE-A 29 36 039). The hydrophilicity of these known systems is based on the presence of ionic centers, especially sulfonate groups, which contain as counterions alkali metal cations or ammonium ions (from tertiary amines), at least some of which remain in the coatings ultimately obtained from the systems, to the considerable detriment of the water resistance of said coatings.

Another possible way to obtain water-dilutable products is to use external emulsifiers. For example, in accordance with U.S. Pat. No. 4,070,323, polyurethanes that contain acryloyl groups are dispersed in water using anionic or cationic oil-in-water emulsifiers, for example, sodium lauryl sulfate. In the course of free-radical crosslinking these emulsifiers are not incorporated into the coating film. The result of this is a substantial reduction in the degree of water resistance which can be achieved in the coating films.

DE-A 39 00 257 describes how, by reacting a polyethylene glycol with a polyisocyanate and a hydroxyalkyl (meth)acrylate, a hydrophilic, radiation-curable urethane acrylate is synthesized which can be used as an emulsifier for hydrophobic urethane acrylates. The emulsifying properties of these products are low and the stability of the dispersions prepared from them is limited.

SUMMARY OF THE INVENTION

An object of the invention is therefore to provide radiation-curable dispersions of improved stability, higher solids content and easier preparation.

These and other objects according to the invention are achieved by an aqueous, radiation-curable binder or binder dispersion comprising (A) a radiation-curable binder that contains (meth)-acrylate groups, and (B) a radiation-curable, hydrophilic polyepoxy-acrylate. In a preferred embodiment, the binder (A) is selected from the group consisting of polyacrylate-acrylates, polyepoxy-acrylates, polyurethane-acrylates, polyester-acrylates, polyether-acrylates, melamine acrylates and the corresponding methacrylic compounds.

The radiation-curable, hydrophilic polyepoxy-acrylate (B) preferably is obtained from a di- or polyepoxy component (B0)

(B1) by reaction with a primary or secondary monoamine of a polyethylene (propylene) glycol monoether, and/or (B2) by reaction with a diisocyanate or polyisocyanate and thereafter with a polyethylene (propylene) glycol monoether and in a subsequent step by reaction with acrylic or methacrylic acid, Polyepoxy-acrylate (B) preferably has a weight-average molecular mass of from 500 to 30000 g/mol and a content of oxyethylene units in structural units derived from polyethylene glycol of from 10 to 90% by mass.

In a preferred embodiment, the dispersion contains 0 to 98% by mass of component (A) and 100 to 2% by mass of component (B).

A process for the preparation of aqueous, radiation-curable binders and binder dispersions according to the invention is provided, which comprises mixing components (A) and (B) and then introducing water into the mixture with stirring. A radiation-curable coating also is provided that comprises a binder or binder dispersion according to the invention. The radiation-curable coating may additionally comprise a photoinitiator.

Other objects, features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

DESCRIPTION OF PREFERRED EMBODIMENTS

The present invention provides hydrophilic, radiation-curable polyepoxy-acrylates that contain lateral polyethylene glycol segments as hydrophilic groups. The polyepoxy-acrylates are readily soluble in water and can be employed both as sole aqueous binders and as emulsifiers.

The invention relates to aqueous, radiation-curable binders and binder dispersions essentially comprising (A) a radiation-curable binder that contains (meth)acrylate groups, and (B) a radiation-curable, hydrophilic polyepoxy-acrylate.

More particularly, the invention relates to aqueous, radiation-curable binders and binder dispersions essentially comprising (A) a radiation-curable binder that contains (meth)acrylate groups, and (B) a radiation-curable, hydrophilic polyepoxy-acrylate obtained from a di- or polyepoxy component (B0)

(B1) by reaction with a primary or secondary monoamine of a polyethylene(propylene) glycol monoether, and/or (B2) by reaction with a diisocyanate or polyisocyanate and thereafter with a polyethylene(propylene) glycol monoether and in a subsequent step by reaction with acrylic or methacrylic acid.

Suitable components (A) are all known binders which carry (meth)acryloyl groups and are therefore radiation-curable. Examples of such polymeric binders are polyacrylate-acrylates, polyepoxy-acrylates, polyurethane-acrylates, polyester-acrylates, polyether-acrylates, melamine acrylates and the corresponding methacrylic compounds. Such polymers are described in detail in "UV&EB Curing Formulation for Printing Inks, Coatings & Paints", edited by R. Holman & P. Oldring, London 1988, ISBN 0 947798 02 1. These polymers do not possess a hydrophilic character.

The radiation-curable, hydrophilic polyepoxy-acrylate (B) is a polyepoxy-(meth)acrylate that contains (meth)acryloyl groups. This component is prepared by reacting acrylic acid or methacrylic acid with a hydrophilic polyepoxide that contains lateral polyethylene(propylene) glycol segments.

This polyepoxy-acrylate (B) also can be used alone as binder.

A hydrophilic polyepoxide of this kind is obtained, in the case of (B1), by reacting a polyepoxide (B0) with a primary or secondary polyethylene(propylene) glycol monoether amine (trade name ®Jeffamine) or, in the case of (B2), by reacting an OH group-containing polyepoxide (B0) with a diisocyanate and thereafter with a polyethylene(propylene) glycol monoether.

Suitable epoxy components (B0) for preparation of the hydrophilic polyepoxides include a large number of the compounds known for this purpose. These compounds contain on average more than one epoxide group, preferably two epoxide groups, per molecule. These epoxy compounds (epoxy resins) may be either saturated or unsaturated and may be aliphatic, cycloaliphatic, aromatic or heterocyclic, and also may contain hydroxyl groups. They also may contain substituents which under the conditions of mixing or reaction do not bring about any interfering secondary reactions, examples being alkyl or aryl substituents, ether groups and the like.

The epoxy compounds (B0) can be prepared by reacting compounds (B01) that have more than one epoxide group per molecule and compounds (B02) having more than one group which is reactive toward epoxide groups. In the preparation it is also possible to employ mixtures with monoepoxides (B03) and/or with compounds (B04) that possess only one group which is reactive toward epoxide groups. Hydroxyl is preferred for the groups which are reactive toward epoxide groups. The compounds (B0) are therefore preferably glycidyl ethers of polyhydric phenols or polyhydric alcohols that have epoxide equivalent weights between 150 and 900 g/mol, but in particular between 150 and 650 g/mol, and hydroxyl numbers of from 0 to 200 mg of KOH/g, preferably from 5 to 100 mg of KOH/g.

Suitable polyhydric phenols (B02) are di- and polyhydroxyaromatic compounds (B021), di- and polyhydroxyaryl ketones (B024), di- and polyhydroxyaryl ethers (B023) and di- and polyhydroxyaryl sulfones (B025), and also his- and polyhydroxyaryl(cyclo)alkanes (B022), for example, resorcinol, hydroquinone, 2,2-bis(4-hydroxyphenyl)-propane (bisphenol A), isomer mixtures of dihydroxydiphenyl-methane (hisphenol F), 4,4,'-dihydroxydiphenylcyclohexane, 4,4'-dihydroxy-3,3,'-dimethyldiphenylpropane, 4,4,'-dihydroxybiphenyl, 4,4,'-dihydroxybenzophenone, 1,1-bis(4,'-hydroxyphenyl)ethane, 1,1-bis(4,'-hydroxyphenyl)isobutane, 2,2-bis(4,'-hydroxy-tert-butylphenyl)propane, bis(2-hydroxynaphthyl)methane, 1,5-dihydroxynaphthalene, tris(4-hydroxyphenyl)methane, bis(4-hydroxyphenyl) ether, bis(4-hydroxyphenyl) sulfone, etc., and the chlorination and bromination products of the above mentioned compounds.

It also is possible to use polyglycidyl ethers of polyalcohols (B026), for example, 1,2-ethanediol diglycidyl ether, 1,2-propanediol diglycidyl ether, 1,3-propanediol diglycidyl ether, butanediol diglycidyl ether, pentanediol diglycidyl ether (also neopentylglycol diglycidyl ether), hexanediol diglycidyl ether, diethylene glycol diglycidyl ether, dipropylene glycol diglycidyl ether, higher polyoxyalkylene glycol diglycidyl ethers, for example, higher polyoxyethylene glycol diglycidyl ethers and polyoxypropylene glycol diglycidyl ethers, mixed polyoxyethylene/propylene glycol diglycidyl ethers, polyoxytetramethylene glycol diglycidyl ethers, polyglycidyl ethers of glycerol, trimethylolpropane, trimethylolethane, pentaerythritol, sorbitol, polyglycidyl ethers of alkoxylated polyols (for example, of glycerol, trimethylolpropane, pentaerythritol, etc.), diglycidyl ethers of cyclohexanedimethanol, of bis(4-hydroxy-cyclohexyl)methane and of 2,2-bis(4,-hydroxycyclohexyl)propane, and polyglycidyl ethers of castor oil or of triglycidyl tris(2-hydroxyethyl)isocyanurate. Preference is given to polyglycidyl ethers that have an epoxide equivalent weight of from 150 to 800 g/mol, in particular from 300 to 400 g/mol.

In particular cases it is possible to use, in addition to the polyglycidyl ethers, small quantities of reactive diluents, such as methyl glycidyl ethers, butyl glycidyl ethers, allyl glycidyl ethers, ethylhexyl glycidyl ethers, long-chain aliphatic glycidyl ethers, for example, cetyl glycidyl ether and stearyl glycidyl ether, monoglycidyl ethers of an isomeric mixture of higher alcohols, glycidyl ethers of a mixture of $C_{12}$ to $C_{13}$ alcohols, phenyl glycidyl ether, cresyl glycidyl ether, p-t-butylphenyl glycidyl ether, p-octylphenyl glycidyl ether, p-phenylphenyl glycidyl ether, glycidyl ethers of an alkoxylated lauryl alcohol, etc., in quantities of up to 30%, preferably 10–20%, based on polyglycidyl ether.

Also suitable are poly(N-glycidyl) compounds which are obtainable by dehydrohalogenation of the reaction products of epichlorohydrin and a mines such as aniline, n-butylamine, bis(4-aminophenyl)methane, m-xylylenediamine or bis(4-methylaminophenyl)-methane. However, the poly(N-glycidyl) compounds also include triglycidyl isocyanurate, N,N'-diglycidyl derivatives of cycloalkylene ureas and diglycidyl derivatives of hydantoins, etc.

In addition, it also is possible to employ polyglycidyl esters of polycarboxylic acids, which are obtained by reacting epichlorohydrin or similar epoxy compounds with an aliphatic, cycloaliphatic or aromatic polycarboxylic acid such as oxalic acid, succinic acid, adipic acid, glutaric acid, phthalic acid, terephthalic acid, tetrahydrophthalic acid, hexahydrophthalicacid, 2,6-napththalenedicarboxylic acid, and diglycidyl esters of higher dicarboxylic acids, for example, dimerized or trimerized linolenic acid. Examples are diglycidyl adipate, diglycidyl phthalate and diglycidyl hexahydrophthalate.

In some cases it also may be advantageous to employ, as epoxy components, copolymers which contain glycidyl ester groups and have been obtained by copolymerization of, for example, glycidyl methacrylate with other (meth)acrylates or by copolymerization with styrene. A detailed listing of suitable epoxy compounds can be found in the handbook "Epoxidverbindungen und Epoxidharze" [Epoxy compounds and Epoxy resins] by A. M. Paquin, Springer Verlag, Berlin 1958, chapter IV, and in Lee Neville Handbook of Epoxy Resins, 1967, chapter 2. In addition, reference is made here to EP-A 272 595 and 286 933. It also is possible to use mixtures of two or more epoxy resins.

The polyoxyalkylenemonoamines required for preparation of the hydrophilic epoxides of type (B1) are compounds of the formula

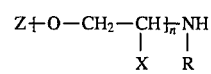

in which X is hydrogen or a methyl or ethyl radical, Z and R are hydrogen or a linear or branched hydrocarbon radical of 1 to 8 carbon atoms, and n is an average value of between 2 and 150.

It is preferred to employ polyoxyalkylenemonoamines of the formula

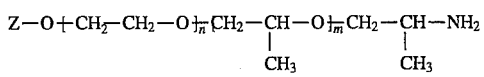

in which Z is a hydrocarbon radical of 1 to 5 carbon atoms, in particular a methyl radical, and independently of one another n=0 to 50 and m=0 to 20.

Some selected examples of the above-described monoamine block copolymers that contain oxyethylene and oxypropylene groups are marketed, for example, by the Texaco Chemical Co., Inc., under the trade name ®Jeffamine M series. Jeffamines M 600, M 1000 and M 2070 are mentioned in particular here.

The hydrophilic epoxy compounds according to the invention (type B1) can be prepared by reacting the epoxides with the polyoxyalkylene monoamines, with stirring and generally with heating, until the theoretically calculated epoxide equivalent weight has been reached, i.e., until all active hydrogens of the polyoxyalkylene monoamine have reacted with the epoxide groups, which are present in excess. The excess of epoxide groups can be varied within a wide range. In the case of diepoxides the molar ratio of N-H groups to diepoxides may be from 1:1.5 to 1:100, preferably from 1:2 to 1:50, the ratio being determined by requirements such as solubility and emulsifiability. The reaction temperatures generally are maintained between 25° and 200° C., preferably between 50° and 150° C. and, in particular, between 80° and 130° C. Depending on the temperature and on the epoxides and amines employed the reaction times are generally between a few minutes and several hours. In most cases no additional catalysts are required for quantitative reaction of the amines with the epoxides.

Suitable di- or polyisocyanates for the preparation of the hydrophilic epoxide in accordance with (B2) are the organic polyisocyanates, that contain isocyanate groups attached to aliphatic, cycloaliphatic and/or aromatic structures, which are known per se from polyurethane chemistry and which preferably have a molecular mass of from 150 to 1000 g/mol, preferably from 150 to 300 g/mol. Suitable examples are 1-isocyanato-3,3,5-trimethyl-5-isocyanatomethylcyclohexane (IPDI), 4,4,'-diisocyanatodicyclohexylmethane, 4,4,'-diisocyanatodiphenylmethane, technical-grade mixtures thereof with 2,4,'-diisocyanatodiphenylmethane and, if desired, with the higher homologs of these diisocyanates, 2,4-diisocyanatotoluene and its technical-grade mixtures with 2,6-diisocyanatotoluene, hexamethylene diisocyanate, trimethylhexamethylene diisocyanate or tetramethylxylylene diisocyanate (TMXDI).

Other suitable polyisocyanates are biuret, isocyanurate or urethane modifications of these simple polyisocyanates. These derivatives generally have molecular masses of up to 1000 g/mol. The preparation of such derivatives is described in, for example, U.S. Pat. Nos. 3,124,604, 3,183,112, 3,919, 218 and 4,324,879.

The polyethylene(propylene) glycol monoethers used are linear monoether glycols that have a molecular mass of from 200 to 20,000 g/mol, preferably from 300 to 15,000 g/mol. At least 80%, preferably 100% of alkylene oxide units in these compounds are ethylene oxide units. These monoether glycols are obtained, for example, by reacting lower alcohols such as methanol, ethanol, isopropanol or the isomeric butanols with ethylene oxide or with an ethylene/propylene oxide mixture.

The term "monoether glycols" therefore is intended not only to comprise true polyethylene glycol monoethers whose alkylene oxide units are exclusively ethylene oxide units, but also polyalkylene glycol monoethers with alkylene oxide units that are predominantly, i.e., to the extent of at least 80%, ethylene oxide units. Such "mixed" polyalkylene glycol monoethers are formed, for example, by using mixtures of different alkylene oxides, for example, ethylene oxide and propylene oxide in a molar ratio of 8:1, during the preparation of the monoether glycols by alkoxylation of suitable monohydric starter molecules, for example, methanol, ethanol, isopropanol or the isomeric butanols. Preference is given, however, to pure polyethylene glycol monoethers.

The preparation of the hydrophilic epoxide that corresponds to (B2) may be carried out, for example, such that the hydroxyl groups of the di- or polyepoxide are reacted beforehand with the di- or polyisocyanate in such a way as to leave surplus free isocyanate groups, which are then reacted with the polyethylene glycol monoether. However, it is also possible to adopt a procedure in which the polyethylene glycol monoether is first reacted with the isocyanate, and then the product is reacted with the OH groups of the polyepoxide. In some cases, however, a procedure can be followed in which the reaction of both OH components with the isocyanate is undertaken simultaneously.

The preparation of these hydrophilic epoxides according to the invention in accordance with (B2), by reacting the above mentioned starting components, can be carried out in bulk or in solvents which are inert with respect to isocyanate groups, for example, acetone, methyl ethyl ketone, ethyl acetate, butyl acetate, toluene, low molecular weight esters of (meth)acrylic acid or in mixtures of such solvents, in which case it is preferred to maintain reaction temperatures of from 20° to 120° C., in particular from 20° to 110° C.

The reaction can also, however, be carried out in the presence of a radiation-curable reactive diluent which is inert with respect to isocyanates, for example, hexanediol diacrylate, trimethylolpropane triacrylate or the triacrylate of ethoxylated trimethylolpropane.

Catalysis of the reaction by compounds such as dibutyltin dilaurate, tin octanoate, tertiary amines or zinc acetylacetonate may be of advantage, without detriment to the quality of the product.

In this reaction, in principle, the nature and proportions of the starting components are selected within the stoichiometric ranges such that, based on all of the starting compounds, the ratio of NCO to OH equivalents is from 0.8 to 1.2 or, respectively, from 1.2 to 0.8.

The preparation of the hydrophilic polyepoxyacryates (B) according to the invention which are to be used as emulsifiers, by reaction of the abovementioned hydrophilic epoxides with (meth)acrylic acid, can be carried out in bulk or in the presence of inert solvents such as acetone, methyl ethyl ketone, ethyl acetate, butyl acetate, toluene, low molecular weight esters of (meth)acrylic acid or mixtures of such solvents, in which case it is preferred to maintain reaction temperatures between 80° and 120° C., in particular between 80° and 110° C.

The reaction of the hydrophilic epoxide (B1) or (B2) also may be carried out in the presence of the polyacrylate (A) which is to be dispersed. For example, where epoxy-acrylates make up the component (A) to be dispersed, the reaction of the starting epoxide and of the hydrophilic epoxide (B1) or (B2) with acrylic acid or methacrylic acid can be carried out simultaneously. It is also possible, however, to employ the polyacrylates A, which are to be dispersed, as inert reaction medium for the reaction of the hydrophilic epoxide (B1) or (B2). The reaction also can be carried out in the presence of a radiation-curable, inert reactive diluent such as hexanediol acrylate, trimethylolpropane triacrylate or the triacrylate of ethoxylated trimethylolpropane.

This reaction can be catalyzed by suitable compounds which are known to the person skilled in the art, representative examples of which include triphenylphosphine, triethylamine, triethanolamine or chromium(III) octanoate.

The relative proportions of epoxide groups to carboxyl groups in the starting compounds for the preparation of the emulsifier (B) are preferably from 1.2:0.8 to 0.8:1.2.

In addition to these unsaturated acids it also is possible to use mono- and dicarboxylic acids and their anhydrides for modification and for achieving particular properties. These acids and/or anhydrides are used in minor amounts. Particularly suitable ones include lauric acid, stearic acid, adipic acid, succinic anhydride, maleic anhydride and dodecenyl succinic anhydride.

The hydrophilic polyepoxides (B) obtained in this way that contain (meth)acryloyl groups have a weight-average molecular mass Mw, which can be determined by gel permeation chromatography, between 500 and 30,000 g/mol, preferably between 800 and 20,000 g/mol, and have a content of ethylene oxide units $C_2H_4O$, incorporated by polyethylene glycol, of from 10 to 90%, preferably from 20 to 90% by mass.

In order to protect the resulting emulsifier from unwanted, premature polymerization it is recommended to add, as early as possible during the preparation, 0.001–0.5% of polymerization inhibitors, based on the overall mass of the mixture. Examples of suitable auxiliaries of this kind are phenols and phenol derivatives, preferably sterically hindered phenols which in both positions ortho to the phenolic hydroxyl group contain alkyl substituents of 1–6 carbon atoms; amines, preferably secondary arylamines and their derivatives; quinones; copper(I) salts of organic acids; or addition compounds of copper(I) halides with phosphites.

Specific examples include 4,4,'-bis(2,6-di-tertbutylphenol), 1,3,5-trimethyl-2,4,6-tris(3',5,'-di-tert-butyl-4,'-hydroxybenzyl)benzene, 4,4,'-butylidenebis(6-tert-o-butyl-m-cresol), diethyl 3,5-di-tert-butyl-4-hydroxybenzylphosphonate, N,N'-bis-(β-naphthyl)-p-phenylenediamine, N,N'-bis(1-methyl-heptyl)p-phenylenediamine, phenyl-β-naphthylamine, 4,4'-bis(α,α-dimethylbenzyl)-diphenylamine, 1,3,5-tris(3',5,'-di-tert-butyl-4-hydroxyhydrocinnamoyl)hexahydro-s-triazine, hydroquinone, p-benzoquinone, 2,5-di-tert-butylquinone, toluhydroquinone, p-tert-butylpyrocatechol, 3-methylpyrocatechol, 4-ethyl-pyrocatechol, chloranil, naphthoquinone, copper naphthenate, copper octanoate and p-nitroso-dimethyl-aniline. Other suitable stabilizers are described in "Methoden der organischen Chemie" [Methods of organic chemistry] (Houben-Weyl), 4th edition, volume XIV/1, pp. 433–452, 756, Georg Thieme Verlag, Stuttgart, 1961.

To prepare the aqueous binders and aqueous dispersions according to the invention components (A) and (B) are mixed, and water is then introduced into this mixture with stirring. The weight ratio of components (A) and (B) is from 0 to 98%, preferably from 0 to 95%, of components (A) and from 100 to 2%, preferably from 30 to 5%, of component (B). In order to form a fine emulsion, it is advantageous to add water in portions at temperatures of below 60° C. until the desired solids content is reached. In this way, it is possible to obtain both clear and opaque binder solutions and stable oil-in-water emulsions.

The aqueous dispersions obtained in this way are valuable aqueous binders for coating compositions. They can be used as such, or in combination with the auxiliaries and additives which are known from paint technology, for example, fillers, pigments, solvents, leveling agents and the like, for the preparation of coatings on any desired substrates. Suitable substrates include paper, cardboard packaging, leather, wood, plastics, nonwovens, textiles, ceramic materials, mineral materials, glass, metal, synthetic leather, and photographic materials, for example, paper provided with a photographic layer.

The dispersions and binder solutions according to the invention may have a solids contents of from 5 to 90% by mass. The term solids content by mass refers to the sum of the mass of binder and emulsifier, based on the mass of the dispersion.

Dispersions according to the invention may be applied in a known manner, by spraying, knife coating, rolling, brushing, dipping or flow coating. After evaporation of the water and of any inert solvents which may have been used, the coatings can be crosslinked either by means of high-energy radiation, such as UV light, electron beams or gamma rays, or by curing with metal salts of siccative acids and (hydro)peroxides at temperatures of between 80° and 250° C.

If the dispersions according to the invention are cured by UV light, the addition of photoinitiators is required. These generally are dissolved in the binder and are dispersed together with the binder in the aqueous phase, or are added subsequently and dispersed. Suitable photoinitiators are the compounds which usually are employed, as described, for example, in the monograph by J. Kosar, "Light-Sensitive Systems", J. Wiley & Sons, New York - London - Sydney, 1965. Others which are highly suited are benzoin ethers, such as benzoin isopropyl ether, benzil ketals, such as benzil dimethyl ketal, and hydroxyalkylphenols, such as 2-hydroxy-2-methyl-1-phenyl-1-propanone.

The abovementioned photoinitiators are employed, depending on the intended use of the compositions according to the invention, in proportions by mass between 0.1 and 10%, preferably between 0.1 and 5%, based on the mass of the dispersed binder. They may be used as the individual substance or else, on account of the advantageous effects which frequently result, in combination with one another.

Sources of radiation that can be used to carry out the photopolymerization include sources that emit within the range of 2500–5000 Å, preferably 3000–4000 Å. It is advantageous to use mercury vapor and xenon lamps, especially high-pressure mercury lamps. In general, layers of the reaction products according to the invention can be cured to form a film in less than one second. If fillers also are used, their use is limited to those which do not hinder the polymerization process as a result of their absorption characteristics. Examples of light-permeable fillers which can be used include talc, barytes, chalk, gypsum, silicic acids, asbestos powders and light spar. If curing is carried out by means of thermal initiators or by high-energy radiation, for example, by electron beams or γ radiation, then it is possible in principle to use all of the fillers, pigments and reinforcing materials which are conventionally employed.

PREPARATION OF THE BINDERS

Example B1

Amounts of 870 parts of Eurepox RV-C (commercial diglycidyl ether based on cyclohexanedimethanol, from Schering AG, epoxide content: 9.1%), 2.5 parts of hydroquinone monomethyl ether and 6 parts of triphenylphosphine were heated to 90° C., while passing in air, and 335 parts of acrylic acid were added over the course of 2 hours. Stirring was continued under these conditions to an acid number less than 5. A pale yellow product was obtained which has a viscosity of 6100 mPas and a double-bond content of 9.1%.

Example B2

Amounts of 3348 parts of Beckopox EP 140 (commercial diglycidyl ether based on hisphenol A, from Hoechst AG, epoxide content: 8.6%), 1.4 parts of hydroquinone monomethyl ether and 16 parts of triethylamine were heated to 90° C., while passing in air, and 1296 parts of acrylic acid were added over the course of 2 h. Stirring was continued under these conditions to an acid number less than 5. A pale yellow product was obtained which has a viscosity of 10,500 mPas and a double-bond content of 9.2%.

Example B3

Amounts of 273 parts of isophorone diisocyanate, 0.8 part of 2,6-di-tert-butyl-4-methylphenol and 1.3 parts of dibutyltin dilaurate were mixed at room temperature, while passing air through the mixture, and a mixture of 166 parts of 2-hydroxypropyl acrylate, 17 parts of hydroxyethyl acrylate, 23 parts of 2-hydroxybutyl acrylate and 160 parts of a trifunctional caprolactone (OH number: 308 mg of KOH/g) was added over the course of 2 h. Subsequently 97 parts of Sartomer 454 (commercial triacrylate of an ethoxylated trimethylolpropane, from Cray-Valley) were added, and stirring was continued until an isocyanate content of less than 0.2% was reached. A colorless product was obtained which had a viscosity of 2400 mPas and a double-bond content of 7.0%.

PREPARATION OF THE EMULSIFIERS B

Example E1 (Hydrophilic Epoxide Type B1)

Amounts of 1050 parts of Beckopox EP 140 (commercial diglycidyl ether based on bisphenol A, from Hoechst AG, epoxide content: 8.6%) and 450 parts of Jeffamine M 2070 were heated at 120° C. for 5 hours, while stirring the mixture and passing nitrogen over it, and were then cooled to 90° C. After addition of 4 parts of hydroquinone monomethyl ether and 9 parts of triphenylphosphine, 360 parts of acrylic acid were added dropwise over the course of 4 hours while continuing to stir the mixture and passing air through it. Stirring was then continued to an acid number less than 5 and an epoxide content less than 0.5%. A pale yellow resin was obtained which had a double-bond content of 6.2%.

Example E2 (Hydrophilic Epoxide Type B1)

Amounts of 875 parts of Eurepox RV-C (commercial diglycidyl ether based on cyclohexanedimethanol, from Schering AG, epoxide content: 9.1%) and 375 parts of Jeffamine M 2070 were heated at 120° C. for 5 hours, while stirring the mixture and passing nitrogen over it, and were then cooled to 90° C. After addition of 3 parts of hydroquinone monomethyl ether and 8 parts of triphenylphosphine, 292 parts of acrylic acid were added dropwise over the course of 4 hours while continuing to stir the mixture and passing air through it. Stirring was then continued to an acid number less than 5 and an epoxide content less than 0.5%. A pale yellow resin was obtained which had a double-bond content of 6.3%.

Example E3 (hydrophilic epoxide type B1)

Amounts of 522 parts of Eurepox RV-C (commercial diglycidyl ether based on cyclohexanedimethanol, from Schering AG, epoxide content: 9.1%) and 2000 parts of Jeffamine M 2070 were heated at 120° C. for 5 hours, while stirring the mixture and passing nitrogen over it, and were then cooled to 90° C. After addition of 5 parts of hydroquinone monomethyl ether and 5 parts of triphenylphosphine, 68 parts of acrylic acid were added dropwise over the course of 4 hours while continuing to stir the mixture and passing air through it. Stirring was then continued to an acid number less than 3 and an epoxide content less than 0.3%. A pale yellow resin was obtained which had a double-bond content of 0.8%.

Example E4 (Hydrophilic Epoxide Type B2)

Amounts of 160 parts of Beckopox EP 140 (commercial diglycidyl ether based on bisphenol A, from Hoechst AG, epoxide content: 8.6%), 200 parts of polyethylene glycol monomethyl ether having a molecular weight of 5000, 40 parts of Sartomer 454 (commercial triacrylate of an ethoxylated trimethylolpropane, from Cray-Valley) and 2 parts of hydroquinone monomethyl ether were heated to 70° C., while air was passed through, and 10 parts of isophorone diisocyanate were added over the course of 30 min. Stirring was then continued at the same temperature to an NCO value less than 0.2%.

After addition of a further 2 parts of hydroquinone monomethyl ether and 5 parts of triphenyl phosphite, 59 parts of acrylic acid were added dropwise over the course of 4 hours, while stirring was continued and air was passed through.

Stirring was then continued to an acid number less than 5 and an epoxide content less than 0.5%. A crystalline resin was obtained which had a double-bond content of 4.0%.

Example BW1 (water-soluble epoxy-acrylate)

Amounts of 49 parts of Beckopox EP 301 (commercial diglycidyl ether based on hisphenol A, from Hoechst AG, epoxide content: 3.3%) and 21 parts of Jeffamine M 1000 were heated at 140° C. for 4 hours, while stirring the mixture and passing nitrogen over it, and were then cooled to 90° C. After addition of 0.2 part of hydroquinone monomethyl ether and 0.4 part of triphenylphosphine, 42 parts of acrylic acid were added dropwise over the course of 4 hours while continuing to stir the mixture and passing air through it. After addition of 6.5 parts of Sartomer 454 (commercial triacrylate of an ethoxylated trimethylolpropane, from Cray-Valley), Valley), stirring was continued to an acid number less than 5 and an epoxide content less than 0.5%. A pale yellow resin was obtained which had a double bond content of 2.5%. An amount of 230 parts of water was then incorporated slowly with vigorous stirring, to give an almost clear aqueous binder solution.

PREPARATION OF THE DISPERSIONS

Example D1

Amounts of 110 parts of binder B1 and 90 parts of emulsifier E1 were heated with stirring to 50° C. and homogenized. An amount of 50 parts of water was introduced over the course of 5 min while stirring with a dissolver (peripheral speed=20 m/sec). After stirring for 15 min the dispersion was cooled to room temperature and diluted with a further 114 parts of water. A white, milky dispersion was obtained which had a viscosity of 520 mPas and a solids content of 55%.

Example D2

Amounts of 135 parts of binder B1 and 165 parts of emulsifier E1 were heated with stirring to 40° C. and homogenized. An amount of 80 parts of water was introduced over the course of 5 min while stirring with a dissolver (peripheral speed=20 m/sec). After stirring for 15 min the dispersion was cooled to room temperature and diluted with 120 parts of water. A white, milky dispersion was obtained which had a viscosity of 730 mPas and a solids content of 6%.

Example D3

Amounts of 88.5 parts of binder B2 and 11.5 parts of emulsifier E3 were heated with stirring to 40° C. and homogenized. An amount of 20 parts of water was introduced over the course of 5 min while stirring with a dissolver (peripheral speed=20 m/sec). After stirring for 15 min the dispersion was cooled to room temperature and diluted with 47 parts of water. A white, milky dispersion was obtained which had a viscosity of 600 mPas and a solids content of 60%.

Example D4

Amounts of 304 parts of binder B1 and 96 parts of emulsifier E4 were heated with stirring to 40° C. and homogenized. An amount of 100 parts of water was introduced over the course of 5 min while stirring with a paddle stirrer (speed of rotation=400 rpm). After stirring for 3 h the dispersion was cooled to room temperature and diluted slowly with 227 parts of water. A white, milky dispersion was obtained which had a viscosity of 720 mPas and a solids content of 55%.

Example D5

Amounts of 81 parts of binder B2 and 19 parts of emulsifier E4 were heated with stirring to 40° C. and homogenized. An amount of 20 parts of water was introduced over the course of 5 min while stirring with a dissolver (peripheral speed=20 m/sec). After stirring for 20 min the dispersion was cooled to room temperature and diluted slowly with 47 parts of water. A white, milky dispersion was obtained which had a viscosity of 650 mPas and a solids content of 60%.

Example D6

Amounts of 85 parts of binder B3 and 15 parts of emulsifier E3 were heated with stirring to 40° C. and homogenized. An amount of 25 parts of water was introduced over the course of 5 min while stirring with a dissolver (peripheral speed=20 m/sec). After stirring for 15 min the dispersion was cooled to room temperature and diluted slowly with 57 parts of water. A white, milky dispersion was obtained which had a viscosity of 530 mPas and a solids content of 55%.

While the invention has been described in detail by reference to preferred embodiments and the foregoing examples, those skilled in the art will appreciate that various modifications can be made to the invention without departing significantly from the spirit and scope thereof. In addition, the disclosures of all of the aforementioned documents are incorporated by reference herein in their entirety.

What is claimed is:

1. An aqueous, radiation-curable binder solution or an aqueous, radiation-curable binder dispersion comprising:
   (A) a radiation-curable binder that contains acrylate groups and/or methacrylate groups, and
   (B) a radiation-curable, hydrophilic polyepoxy-acrylate obtained from a di- or polyepoxy component (B0) reacted with
   (B1) a primary or secondary monoamine of a polyethylene(propylene) glycol monoether, and/or
   (B2) a diisocyanate or polyisocyanate and with a polyethylene(propylene) glycol monoether; and in a subsequent step by reaction with an acrylic and/or methacrylic acid.

2. An aqueous, radiation-curable binder solution or binder dispersion as claimed in claim 1, wherein the binder (A) is selected from the group consisting of polyacrylate-acrylates, polyepoxy-acrylates, polyurethane-acrylates, polyester-acrylates, polyether-acrylates, melamine acrylates and the corresponding methacrylic compounds.

3. An aqueous, radiation-curable binder solution or binder dispersion as claimed in claim 1, wherein the di- or polyepoxy component (B0) is obtained by reacting
   (B01) compounds having more than one epoxide group per molecule, and
   (B02) compounds having more than one group which is reactive toward epoxide groups.

4. An aqueous, radiation-curable binder solution or binder dispersion as claimed in claim 3, wherein the step of obtaining the di- or polyepoxy component (B0) additionally comprises reaction with one or more compounds selected from the group consisting of
   (B03) compounds that contain one epoxide group per molecule, and
   (B04) compounds that contain one group which is reactive toward epoxide groups.

5. An aqueous, radiation-curable binder solution or binder dispersion as claimed in claim 3, wherein the compounds (B02) that have more than one group which is reactive toward epoxide groups are selected from the group consisting of
   (B021) polyhydroxyaromatic compounds,
   (B022) poly(hydroxyaryl)(cyclo)alkanes,
   (B023) polyhydroxyaryl ethers,
   (B024) polyhydroxyaryl ketones,
   (B025) polyhydroxyaryl sulfones, and
   (B026) aliphatic linear, branched and cyclic polyhydroxy compounds.

6. An aqueous, radiation-curable binder solution or binder dispersion as claimed in claim 1, wherein the di- or polyepoxy component (B0) comprises one or more poly-N-glycidyl compounds.

7. An aqueous, radiation-curable binder solution or binder dispersion as claimed in claim 1, wherein the di- or polyepoxy component (B0) comprises polyglycidyl esters of polycarboxylic acids.

8. An aqueous, radiation-curable binder solution or binder dispersion as claimed in claim 1, wherein the di- or polyepoxy component (B0) comprises copolymers which contain glycidyl ester groups.

9. An aqueous, radiation-curable binder solution or binder dispersion as claimed in claim 1, wherein the epoxy component (B) has a weight-average molecular mass of from 500 to 30000 g/mol.

10. An aqueous, radiation-curable binder solution or binder dispersion as claimed in claim 1, wherein the polyepoxyacrylate component (B) has a content of oxyethylene units in structural units derived from polyethylene glycol of from 10 to 90% by mass.

11. An aqueous, radiation-curable binder solution or binder dispersion as claimed in claim 1, wherein the content of component (A) is from 0 to 98% by mass and that of component (B) is from 100 to 2% by mass based on the total mass of (A) and (B).

12. An aqueous, radiation-curable binder solution or binder dispersion as claimed in claim 11, wherein component (A) is not present.

13. An aqueous, radiation-curable binder solution or binder dispersion as claimed in claim 1, wherein component (B) comprises one or more hydrophilic radiation-curable polyepoxy-acrylates that contains one or more lateral polyethylene glycol segments as hydrophilic group.

14. An aqueous, radiation-curable binder solution or binder dispersion as claimed in claim 1, wherein component (B) is prepared by reacting acrylic acid or methacrylic acid with a hydrophilic polyepoxide that contains lateral polyethylene (propylene) glycol segments.

15. An aqueous, radiation-curable binder solution or binder dispersion as claimed in claim 1, wherein the binder (A) is selected from the group consisting of polyacrylate-acrylates, polyurethane-acrylates, polyester-acrylates, polyether-acrylates, melamine acrylates, and the corresponding methacrylic compounds.

16. An aqueous, radiation-curable binder solution or binder dispersion as claimed in claim 1, wherein (B1) is used.

17. An aqueous, radiation-curable binder solution or binder dispersion as claimed in claim 1, wherein (B2) is used.

18. An aqueous radiation-curable binder solution or binder dispersion as claimed in claim 17, wherein the polyethylene(propylene) glycol monoether is at the end of the polymer chain and not incorporated in the middle of the chain.

19. An aqueous, radiation-curable binder solution or binder dispersion as claimed in claim 1, wherein a component (A) different from component (B) is used.

20. A radiation-curable coating composition comprising a binder solution or binder dispersion as claimed in claim 1.

21. A substrate coated with a coating composition according to claim 20.

22. A radiation-curable coating composition comprising a binder solution or binder dispersion as claimed in claim 1, wherein said coating comprises a photoinitiator.

23. A process for the preparation of aqueous, radiation-curable binder solutions and binder dispersions, which comprises mixing components (A) and (B) and then introducing water into the mixture with stirring.

* * * * *